United States Patent
Hagino et al.

(10) Patent No.: US 7,268,536 B2
(45) Date of Patent: Sep. 11, 2007

(54) MAGNETIC LINEAR POSITION SENSOR

(75) Inventors: Hiroshi Hagino, Kiryu (JP); Atushi Yamamoto, Kiryu (JP); Takanobu Igarashi, Kiryu (JP); Masahiro Horiguchi, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 227 days.

(21) Appl. No.: 11/029,482

(22) Filed: Jan. 6, 2005

(65) Prior Publication Data

US 2005/0151535 A1   Jul. 14, 2005

(30) Foreign Application Priority Data

Jan. 8, 2004   (JP)   ............... 2004-002614

(51) Int. Cl.
*G01B 7/14* (2006.01)
*G01R 33/07* (2006.01)
*H01L 43/04* (2006.01)
*G01R 33/09* (2006.01)
*H01L 43/08* (2006.01)

(52) U.S. Cl. ............................... 324/207.24; 324/207.2

(58) Field of Classification Search ............. 324/207.2, 324/207.21, 207.22, 207.23, 207.24, 251, 324/207.25; 338/32 R, 32 H; 335/205, 335/207, 302, 306

See application file for complete search history.

(56) References Cited

U.S. PATENT DOCUMENTS

| | | | | |
|---|---|---|---|---|
| 4,425,557 A | * | 1/1984 | Nakamura | ............... 338/32 H |
| 5,608,317 A | * | 3/1997 | Hollmann | ................. 324/207.2 |
| 6,211,668 B1 | * | 4/2001 | Duesler et al. | ........... 324/207.2 |
| 6,222,359 B1 | * | 4/2001 | Duesler et al. | ........ 324/207.12 |
| 6,304,078 B1 | * | 10/2001 | Jarrard et al. | ............ 324/207.2 |
| 6,576,890 B2 | * | 6/2003 | Lin et al. | ............... 250/231.14 |
| 6,789,948 B2 | * | 9/2004 | Nakajima | .................... 384/448 |
| 6,867,583 B2 | * | 3/2005 | Mizutani et al. | ........ 324/207.24 |
| 7,034,524 B2 | * | 4/2006 | Schumacher | ........... 324/207.22 |
| 7,088,096 B2 | * | 8/2006 | Etherington et al. | ... 324/207.24 |
| 2004/0239313 A1 | * | 12/2004 | Godkin | ..................... 324/207.2 |

FOREIGN PATENT DOCUMENTS

| | | |
|---|---|---|
| JP | 64-9302 A | 1/1989 |
| JP | 2000-180114 A | 6/2000 |
| JP | 2002-206911 A | 7/2002 |
| JP | 2003-274624 A | 9/2003 |
| JP | 2004-177398 A | 6/2004 |

* cited by examiner

*Primary Examiner*—Edward Lefkowitz
*Assistant Examiner*—Kenneth J. Whittington
(74) *Attorney, Agent, or Firm*—Birch, Stewart, Kolasch and Birch, LLP

(57) ABSTRACT

A magnetic linear position sensor comprises a first yoke which is made of soft magnetic material; a first magnet which is placed at the first yoke, and whose surface is the N-pole and is inclined; a second magnet which is placed at the first yoke, and whose surface is the S-pole and is inclined in a direction opposite to the surface of the first magnet and in a direction facing the surface of the first magnet; a second yoke which is placed at a position opposing the first magnet and the second magnet through an air gap and is made of soft magnetic material; and a magnetoelectric transducer which is placed in the air gap.

5 Claims, 5 Drawing Sheets

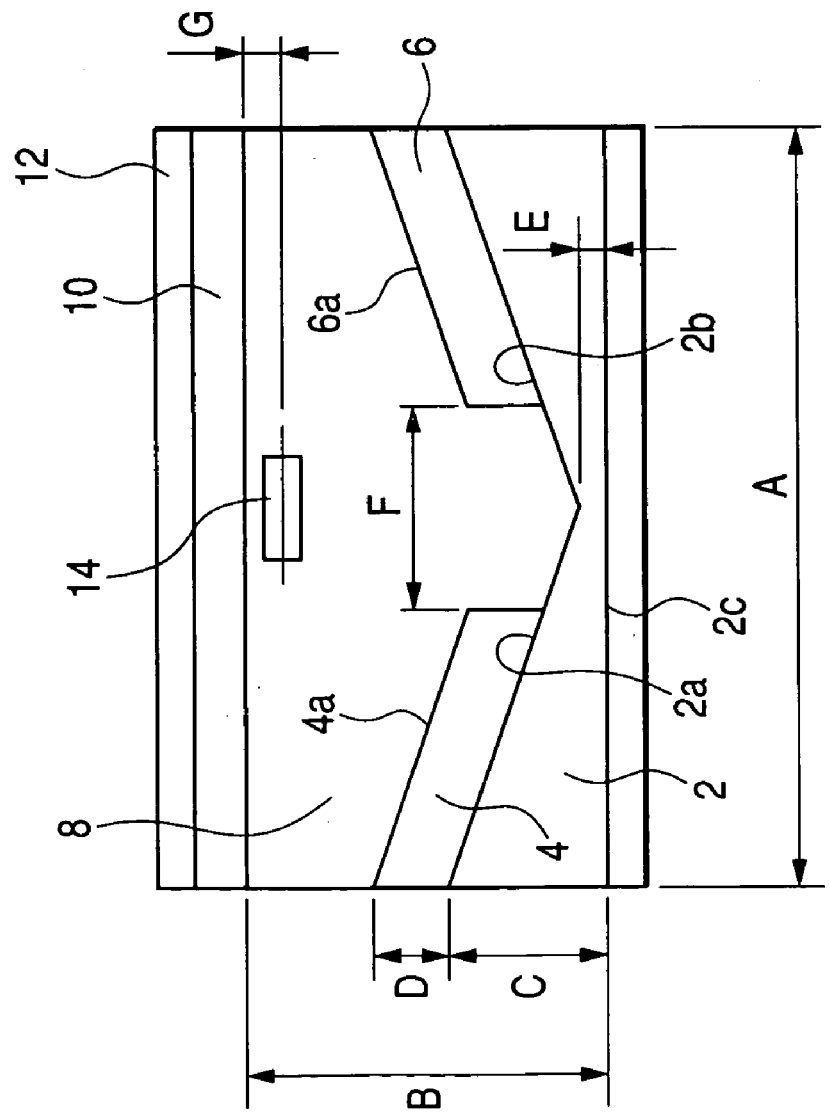

LINEAR DISPLACEMENT (mm)

LINEAR DISPLACEMENT (mm)

MAGNETIC LINEAR POSITION SENSOR

BACKGROUND OF THE INVENTION

1. Field of the Invention

The present invention relates to a magnetic linear position sensor for detecting linear displacement in a non-contact manner using a magnetoelectric transducer such as a Hall element which transforms a change in a magnetic flux into a voltage.

2. Description of the Related Art

Referring to FIG. 6, a conventional magnetic linear position sensor will be described. A sensor gap 24 is made between two stator yokes 20 and 22 which are made of soft magnetic material. A Hall element 26 is placed in the sensor gap 24, and the Hall element 26 outputs a voltage in accordance with change in a magnetic flux. The stator yokes 20 and 22 and the Hall element 26 form a stator. A permanent magnet 30 is provided through a principal air gap 28 that is perpendicular to the sensor gap 24, and the permanent magnet 30 is magnetized to the N-pole and the S-pole in the thickness direction. The permanent magnet 30 and a yoke 34 which is made of soft magnetic material are fixed. Two leg portions 32 of the yoke 34 oppose the stator with nearly the same air gap as the principal air gap 28. A slider 36 is attached to the yoke 34, and the permanent magnet 30 and the yoke 34 form a mover which can move linearly along the stator.

In this magnetic linear position sensor, in the case where the mover is positioned at the center of the stator as shown in FIG. 6, the permanent magnet 30, the yoke 34, the leg portions 32, and the stator yokes 20 and 22 form magnetic circuits A and B, and the magnetic flux passing through the Hall element 26 is zero. When the mover moves to the right, the balance between the magnetic circuits A and B is lost and the magnetic flux of the magnetic circuit A passes through the Hall element 26. The magnetic flux passing through the Hall element 26 increases gradually as the mover moves to the right side from the state shown in FIG. 6 and then becomes the maximum at the state shown in FIG. 7. Further, when the mover moves to the left, the magnetic flux of the magnetic circuit B passes through the Hall element 26. The magnetic flux passing through the Hall element 26 increases gradually as the mover moves to the left side from the state shown in FIG. 6 and then becomes the maximum at the state shown in FIG. 8. In this case, since the magnetic flux of the magnetic circuit B is opposite in direction to the magnetic flux of the magnetic circuit A, if the move to the right by the slider 36 as shown in FIG. 7 is put into a plus, the move to the left by the slider 36 as shown in FIG. 8 is detected as a minus. Thus, the Hall element 26 detects the magnetic flux, and thereby linear displacement can be detected in a non-contact manner.

However, since lines of the magnetic flux pass through two stator yokes 20 and 22 and the lines of the magnetic flux change in direction and in polarity from the N-pole to the S-pole as the permanent magnet 30 of the mover moves, due to magnetizing properties of soft magnetic material of the stator yokes 20 and 22, a hysteresis phenomenon occurs. That is, there occurs a difference between the output voltages of the Hall element 26 at the same position in the case where the mover moves to one side and in the case where the mover returns and moves to the other side.

In general, hysteresis of about 0.5% of full scale remains in the case of using soft magnetic iron as the soft magnetic material, and hysteresis of about 0.2% remains in the case of using a high-grade silicon steel plate, and hysteresis of about 0.1% remains even in the case of using higher-grade magnetic material such as permalloy; therefore, there is a problem for an application that high degree of detection accuracy is required for.

It is a possible solution of this problem to reduce the difference of the output voltages by a hysteresis characteristic of the soft magnetic material. However, it is very difficult to decrease or eliminate the hysteresis in this kind of magnetic circuit structure. For example, using high-grade magnetic material and adding anneal processing in order to reduce the hysteresis increase the cost of the whole magnetic linear position sensor. Furthermore, in the case of an application of emphasizing reproducibility of a detection value as a demand characteristic to the magnetic linear position sensor, even hysteresis of the order of 0.1% cannot be neglected and there may be a problem that the value is big in terms of the accuracy, and it is desirable that there is no hysteresis.

SUMMARY OF THE INVENTION

It is an object of the present invention to provide a magnetic linear position sensor that does not cause a hysteresis error in output of a magnetoelectric transducer.

According to the present invention, there is provided a magnetic linear position sensor which comprises a first yoke which is made of soft magnetic material; a first magnet which is placed at the first yoke, and whose surface is the N-pole and is inclined; a second magnet which is placed at the first yoke, and whose surface is the S-pole and is inclined in a direction opposite to the surface of the first magnet and in a direction facing the surface of the first magnet; a second yoke which is placed at a position opposing the first magnet and the second magnet through an air gap and is made of soft magnetic material; and a magnetoelectric transducer which is placed in the air gap.

Since the magnetic linear position sensor detects a magnetic field in the air gap with the magnetoelectric transducer, a hysteresis characteristic accompanying a magnetic circuit does not occur theoretically; therefore, output of the magnetoelectric transducer does not have a hysteresis error.

BRIEF DESCRIPTION OF THE DRAWINGS

FIGS. 1(*a*) and 1(*b*) are diagrams showing the basic structure of a magnetic linear position sensor according to the present invention;

DETAILED DESCRIPTION OF THE INVENTION

Figure 2A:
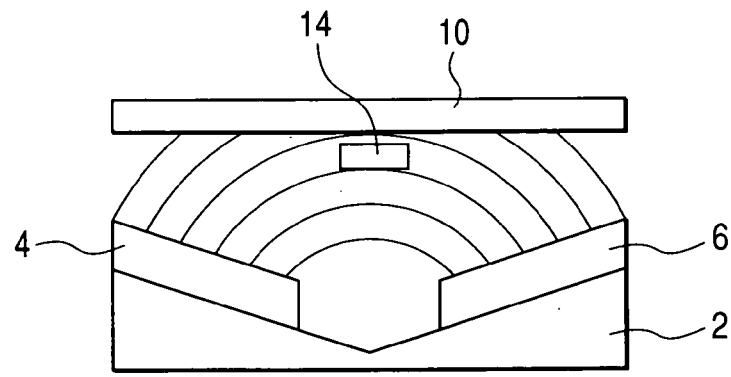
FIGS. 2(*b*), 2(*b*), and 2(*c*) are diagrams for explaining a flow of a magnetic flux and the operating principle of the magnetic linear position sensor shown in FIGS. 1(*a*) and 1(*b*)

A magnetic linear position sensor according to the present invention will be described with reference to FIG. 1(a) (front view) and FIG. 1(b) (side view). V-shaped inclined planes 2a and 2b are placed on the upper part of a first yoke 2 made of soft magnetic material. The angles of inclination for the inclined planes 2a and 2b are the same. The inclined planes 2a and 2b are arranged in the direction of detecting linear displacement, and a bottom face 2c of the yoke 2 is parallel to the direction of detecting the linear displacement. A first magnet 4 is placed on the inclined plane 2a, and a surface 4a of the magnet 4 is the N-pole. A second magnet 6 is placed on the inclined plane 2b, and a surface 6a of the magnet 6 is the S-pole. The surface 4a of the magnet 4 is inclined, and the surface 6a of the magnet 6 is inclined in the direction opposite to and facing the surface 4a, and the angles of inclination for the surfaces 4a and 6a are the same. The surfaces 4a and 6a are arranged in the direction of detecting linear displacement, and the surfaces 4a and 6a are shaped like a letter V. A second yoke 10 is placed at a position opposing the magnets 4 and 6 through an air gap 8, and the yoke 10 is made of soft magnetic material and is parallel to the direction of detecting the linear displacement. The yoke 2, the magnets 4 and 6, and the yoke 10 are combined into an integral structure with a frame 12 made of non-magnetic material, forming a magnetic circuit block. A magnetoelectric transducer 14 such as a Hall element is placed in the air gap 8. The magnetoelectric transducer 14 can move against the magnetic circuit block in the direction parallel to the yoke 10, that is, in the direction of detecting the linear displacement. A magnetic sensitive surface of the magnetoelectric transducer 14 is parallel to the direction of detecting the linear displacement. That is, the magnetic sensitive surface of the magnetoelectric transducer 14 is parallel to the longitudinal direction of the yoke 10 and is faced in the direction of detecting a change in flux density perpendicular to the direction of travel of the magnetoelectric transducer 14.

Figure 2B:
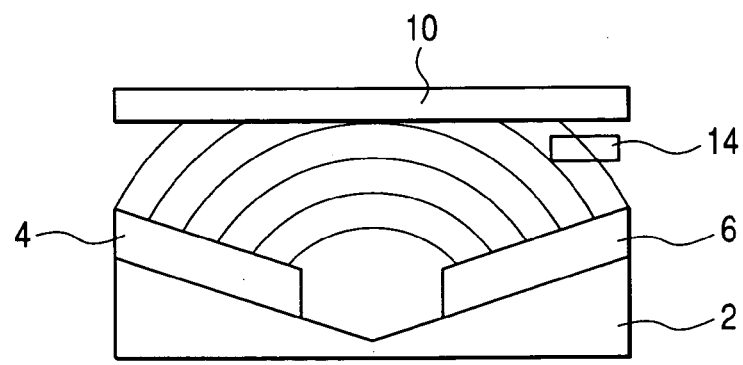

Referring to FIGS. 2(a) and 2(b), a flow of a magnetic flux and the operating principle of the magnetic linear position sensor shown in FIGS. 1(a) and 1(b) will be described. Since the surfaces 4a and 6a of the magnets 4 and 6 are inclined like a letter V, the length from the surfaces 4a and 6a to the yoke 10 of the air gap 8 varies linearly such that it becomes large at the center portion in the direction of detecting the linear displacement and small at both ends; therefore, lines of a magnetic flux travel in curves to the magnet 6 coming out of the magnet 4. For this reason, lines of the magnetic flux coming out of the magnet 4 flow into the magnet 6 directly at the center portion of the magnets 4 and 6; however, as it goes from the center portion of the magnets 4 and 6 toward the both ends, lines of the magnetic flux coming out of the magnet 4 flow into the yoke 10 as well, and lines of the magnetic flux passing through the yoke 10 to the magnet 6 increase. Thus, a change pattern of the flux density is formed in the air gap 8 between the magnets 4 and 6 and the yoke 10. Particularly, in terms of the flux component perpendicular to the yoke 10, the flux component perpendicular to the yoke 10 is zero at the center portion, and becomes larger as it goes outward. Therefore, by placing the magnetic sensitive surface of the magnetoelectric transducer 14 parallel to the longitudinal direction of the yoke 10 and making the magnetoelectric transducer 14 move linearly in the direction parallel to the yoke 10 in the air gap 8, the flux density detected by the magnetoelectric transducer 14 varies linearly.

Figure 2C:
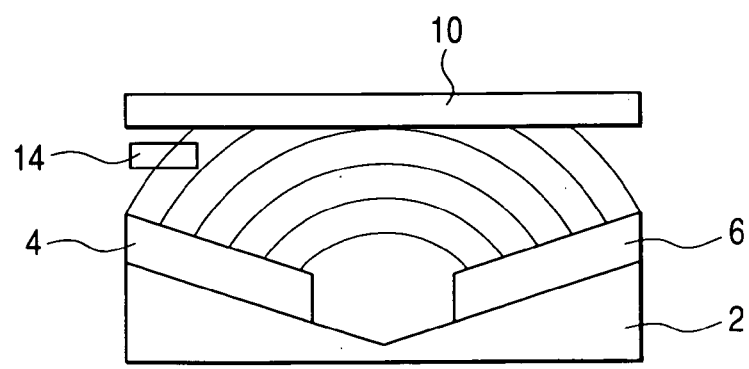

That is, as shown in FIG. 2(a), in the case where the magnetoelectric transducer 14 is positioned at the center, since the flux component perpendicular to the magnetic sensitive surface of the magnetoelectric transducer 14 is zero, the output voltage of the magnetoelectric transducer 14 is zero. Further, as shown in FIG. 2(b), as the magnetoelectric transducer 14 moves to the right side from the center, the flux component perpendicular to the magnetic sensitive surface of the magnetoelectric transducer 14 gradually increases and then becomes the maximum at the right end. On the other hand, as shown in FIG. 2(c), as the magnetoelectric transducer 14 moves to the left side from the center, the flux component perpendicular to the magnetic sensitive surface of the magnetoelectric transducer 14 gradually increases and then becomes the maximum at the left end. In this case, since the lines of the magnetic flux in the case of FIG. 2(c) is opposite in direction to the lines of magnetic flux in the case of FIG. 2(b), the polarity of the output voltage of the magnetoelectric transducer 14 is reversed. Thus, with the output voltage of the magnetoelectric transducer 14, the linear displacement can be detected in a non-contact manner.

Further, according to the above explanation, the magnetoelectric transducer 14 moves in the air gap 8; however, by fixing the magnetoelectric transducer 14 and making the magnetic circuit block move instead, the linear displacement can also be detected in a non-contact manner with the output voltage of the magnetoelectric transducer 14.

Figure 3:
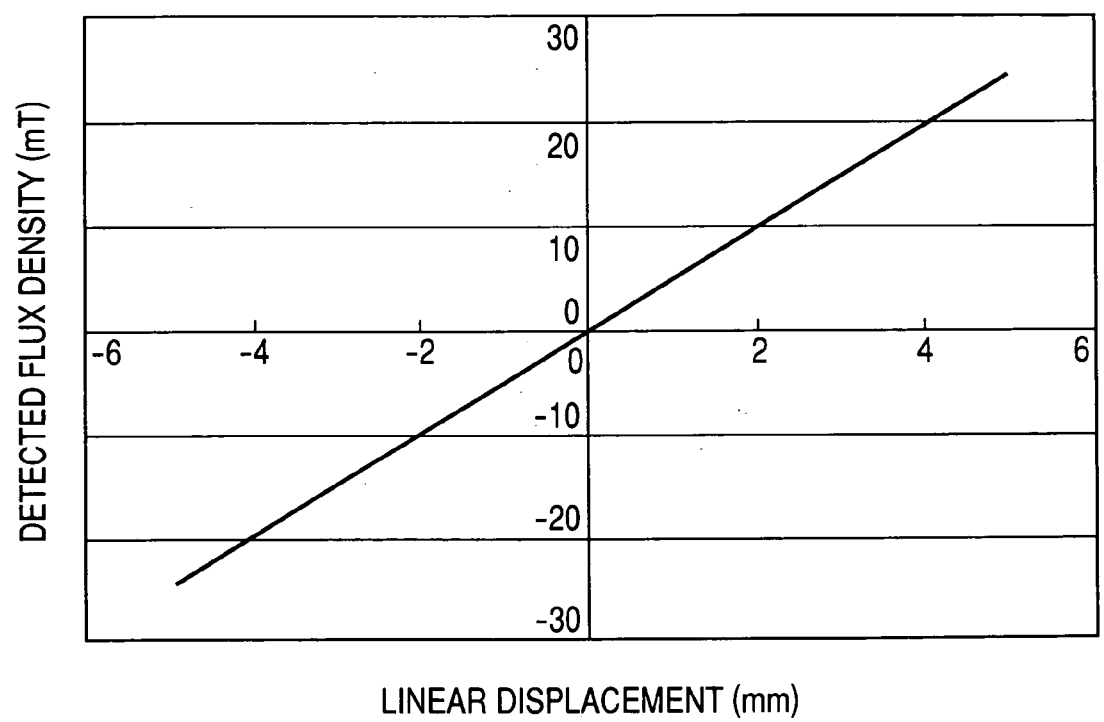
FIG. 3 is a graph showing a relationship between linear displacement and detected flux density for the magnetic linear position sensor shown in FIGS. 1(*a*) and 1(*b*)

FIG. 3 is a graph showing a relationship between the linear displacement and the detected flux density for the magnetic linear position sensor, in the case where A=30 mm, B=14 mm, C=6 mm, D=2.5 mm, E=1 mm, F=8 mm, G=1.5 mm, in FIG. 1(a) and the detectable linear displacement is 10 mm.

Figure 4:
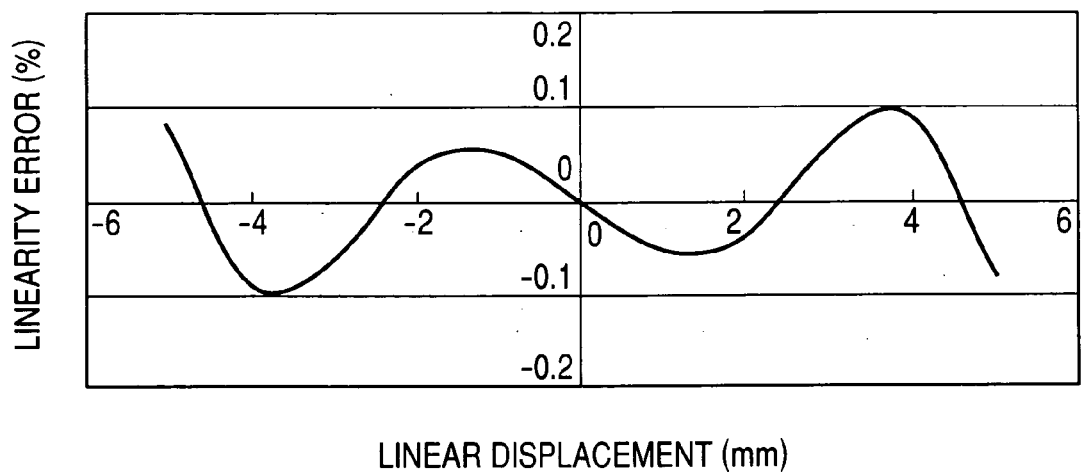
FIG. 4 is a graph showing a relationship between linear displacement and linearity error for the magnetic linear position sensor shown in FIGS. 1(*a*) and 1(*b*)

FIG. 4 is a graph showing a relationship between the linear displacement and linearity error for the magnetic linear position sensor. The linearity error which is the deviation from a straight line is equal to or less than 0.1%.

Figure 5:
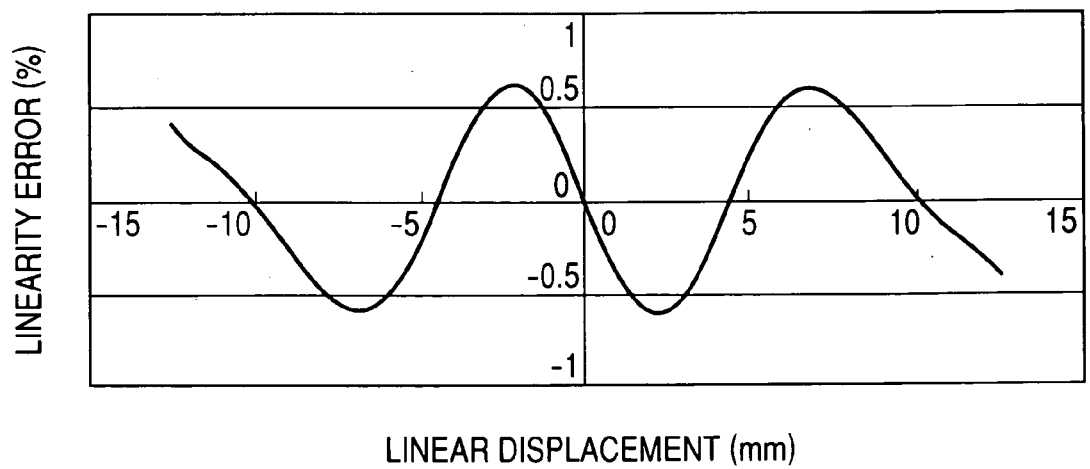
FIG. 5 is a graph showing a relationship between linear displacement and linearity error for the magnetic linear position sensor shown in FIGS. 1(*a*) and 1(*b*)
Figure 6:
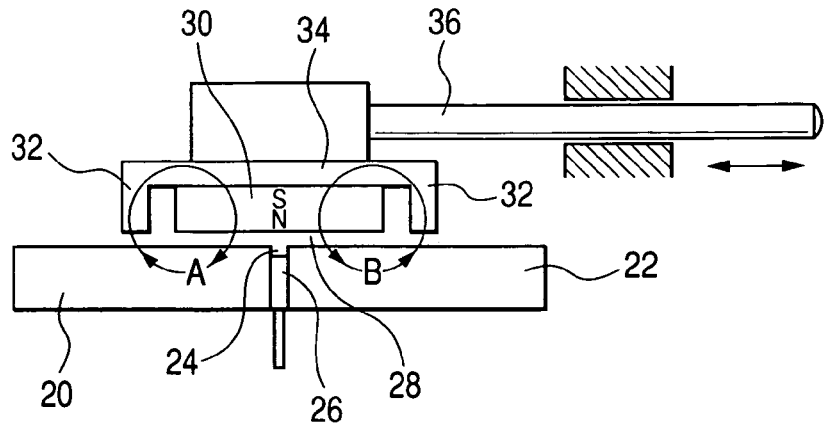
FIG. 6 is a diagram showing the basic structure of a conventional magnetic linear position sensor.
Figure 7:
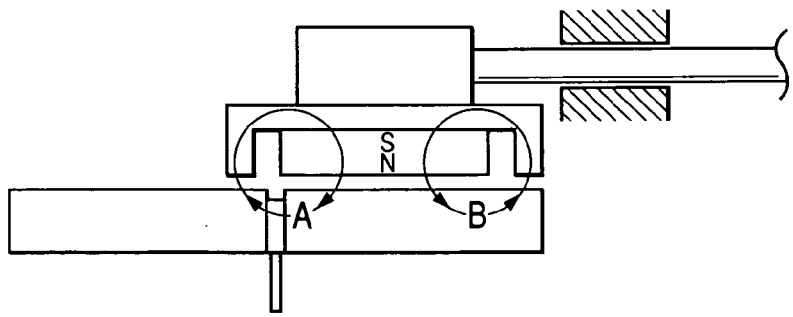
FIG. 7 is a diagram for explaining operation of the magnetic linear position sensor shown in FIG. 6.
Figure 8:
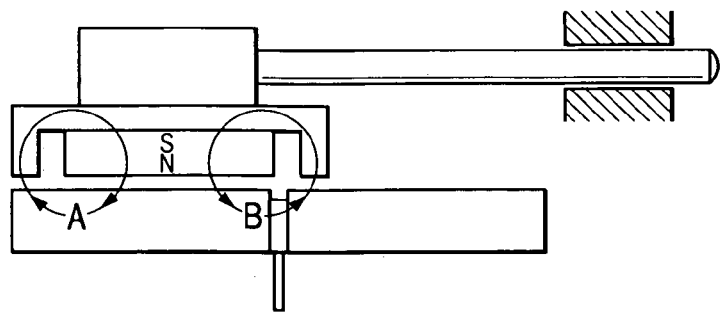
FIG. 8 is a diagram for explaining operation of the magnetic linear position sensor shown in FIG. 6.

FIG. 5 is a graph showing a relationship between the linear displacement and the linearity error for the magnetic linear position sensor, in the case where A=34 mm, B=13 mm, C=6.7 mm, D=2.5 mm, E=1 mm, F=8 mm, G=2.5 mm, in FIG. 1(a) and the detectable linear displacement is 25 mm. In this case, the linearity error is equal to or less than 0.6%.

The above dimensions are examples, and various combinations thereof can be made. In accordance with demand characteristics such as measurement range and linearity, optimal values can be obtained using magnetic field analysis simulation or the like. The results in the above examples are obtained in that way.

Thus, the magnetic linear position sensor detects the magnetic field in the air gap 8 with the magnetoelectric transducer 14, and placement of the magnets 4 and 6 and the yoke 10 is fixed, and also flows of lines of the magnetic force in the magnetic circuit are fixed. Since the combination of the magnets 4 and 6 and the yoke 10 moves with them integrated, the hysteresis characteristic accompanying the magnetic circuit does not occur theoretically; therefore, the output of the magnetoelectric transducer 14 does not have a hysteresis error.

Further, as the magnetoelectric transducer 14, a magnetoresistance effect sensor, an MI (Magneto-impedance) sensor, and the like as well as the Hall element can be used. Especially, a programmable Hall IC which uses the Hall element as a magnetic sensitive section and integrates an AD converter, a DSP, a DA converter, etc. is appropriate for this kind of application. Since the programmable Hall IC includes a gain control function of determining a relationship between the flux density and the output voltage, a function of changing the polarity of the magnetic field and the polarity of the output voltage, and a temperature characteristic compensation function of canceling change in a magnetic property by temperature change and these functions are programmable, it is the easiest-to-use magneto-electric transducer under the present circumstances, and gain setting for determining sensor sensitivity and correction for temperature characteristics of magnets can be performed easily.

Furthermore, the magnets 4 and 6 are shaped like a sheet, and a sheet-forming type of magnet is appropriate therefor. It has a merit of producing at low cost due to no need of an expensive mold since the magnets 4 and 6 are cut from a material rolled into an even sheet and are easily produced. Especially, a sheet-forming type of the SmFeN rare earth bonded magnet has a small temperature coefficient of a magnetic property and high heat resistance of 150 degrees C.; therefore, it is optimal material in the case of using the magnetic linear position sensor as an automotive sensor and the like.

The magnetic linear position sensor is used as a sensor for detecting mechanical linear displacement as electric output and is appropriate for detecting a position of a component of machinery such as a position of a printing cylinder of an offset printing machine, a position of a throttle valve of an automobile, etc. In comparison with a contact sensor such as a potentiometer, due to the non-contact structure, there is no wear by mechanical vibration; therefore, the sensor can be extremely reliable.

What is claimed is:

1. A magnetic linear position sensor comprising:
   a) a first yoke which is made of soft magnetic material, having a lower horizontal surface and an upper surface formed of two inclined planes arranged in a V-shape;
   b) a first magnet which is placed on one of said inclined planes of the first yoke, and whose upper surface is the N pole and is inclined;
   c) a second magnet which is placed on another inclined plane of the first yoke, and whose upper surface is the S pole and is inclined in a direction opposite to the upper surface of the first magnet and in a direction facing the surface of the first magnet;
   d) a second yoke having a horizontal planar surface which is placed at a position opposing the first magnet and the second magnet through an air gap and is made of soft magnetic material; and
   e) a magnetoelectric transducer which is placed in the air gap.

2. The magnetic linear position sensor according to claim 1, wherein a sheet-forming type of magnet is used as the first magnet and the second magnet.

3. The magnetic linear position sensor according to claim 2, wherein a sheet forming type of the SmFeN rare earth bonded magnet is used as the first magnet and the second magnet.

4. The magnetic linear position sensor according to claim 1, wherein a programmable Hall IC is used as the magnetoelectric transducer.

5. A magnetic linear position sensor comprising:
   a) a first yoke which is made of soft magnetic material, having a lower horizontal surface and an upper surface formed of two inclined planes arranged in a V-shape;
   b) a first magnet which is placed on one of said inclined planes of the first yoke, and whose upper surface is the N pole and is inclined;
   c) a second magnet which is placed on another inclined plane of the first yoke, and whose upper surface is the S pole and is inclined in a direction opposite to the upper surface of the first magnet and in a direction facing the surface of the first magnet;
   d) a second yoke having a horizontal planar surface which is placed at a position opposing the first magnet and the second magnet through an air gap and is made of soft magnetic material;
   e) a magnetoelectric transducer which is placed in the air gap; and
   f) lines of magnetic flux traveling in curves between said first magnet and said second magnet and flowing into said second yoke so that a flux component perpendicular to the second yoke is zero near said center position and larger away from said center position so that a flux density detected by said magnetoelectric transducer varies linearly.

* * * * *